(12) United States Patent
Han (10) Patent No.: US 10,899,312 B2
(45) Date of Patent: Jan. 26, 2021

(54) SAFETY BELT RETRACTOR, A VEHICLE SAFETY BELT AND A VEHICLE

(71) Applicant: TRW AUTOMOTIVE TECHNOLOGIES (SHANGHAI) CO., LTD., Shanghai (CN)

(72) Inventor: Yong Han, Shanghai (CN)

(73) Assignee: TRW AUTOMOTIVE TECHNOLOGIES (SHANGHAI) CO. LTD, Shanghai (CN)

( * ) Notice: Subject to any disclaimer, the term of this patent is extended or adjusted under 35 U.S.C. 154(b) by 194 days.

(21) Appl. No.: 16/087,307

(22) PCT Filed: Mar. 21, 2017

(86) PCT No.: PCT/CN2017/077580
§ 371 (c)(1),
(2) Date: Sep. 21, 2018

(87) PCT Pub. No.: WO2017/162153
PCT Pub. Date: Sep. 28, 2017

(65) Prior Publication Data
US 2019/0039562 A1   Feb. 7, 2019

(30) Foreign Application Priority Data
Mar. 21, 2016  (CN) .......................... 2016 1 0160006

(51) Int. Cl.
*B60R 22/28* (2006.01)
*B60R 22/34* (2006.01)
*B60R 22/46* (2006.01)

(52) U.S. Cl.
CPC .......... *B60R 22/3413* (2013.01); *B60R 22/28* (2013.01); *B60R 22/46* (2013.01); *B60R 22/4676* (2013.01); *B60R 2022/286* (2013.01)

(58) Field of Classification Search
CPC ......... B60R 22/28; B60R 22/34; B60R 22/46; B60R 22/3413; B60R 22/4676; B60R 2022/286
See application file for complete search history.

(56) References Cited

U.S. PATENT DOCUMENTS 8,042,835 B2   10/2011   Beig et al.
2003/0052209 A1*  3/2003   Honl ........................ B60R 22/46
                                                                    242/374
(Continued)

FOREIGN PATENT DOCUMENTS

| CN | 102490681   | 6/2012 |
| DE | 102006043022 | 3/2008 |
| DE | 102010054845 | 3/2013 |

*Primary Examiner* — Sang K Kim
(74) *Attorney, Agent, or Firm* — Tarolli, Sundheim, Covell & Tummino LLP (57) ABSTRACT

A safety belt retractor, a vehicle safety belt with the safety belt retractor and a vehicle with the vehicle safety belt are provided. The safety belt retractor is provided, on an end segment thereof, with a pre-tensioning, force-limiting and decoupling device that comprises a safety belt reel (1), a driving element (2), a sleeve (3) and an energy absorbing disc (4). The safety belt reel (1) is provided with a first recess (10) and a second recess. A first helical surface (9) is arranged in the first recess (10), and the driving element (2) is provided with a first projection (21) having a second helical surface acting together with the first helical surface (9). The sleeve (3) is provided with a second projection (31) mounted in the second recess. Under a predetermined load, the second projection (31) is cut off, such that the energy absorbing disc (4) is plastically deformed due to squeezing. The safety belt retractor achieves on the same end segment, the pre-tensioning, force-limiting and decoupling functions as well as a compact structure.

17 Claims, 4 Drawing Sheets

(56) References Cited

U.S. PATENT DOCUMENTS

| | | | |
|---|---|---|---|
| 2009/0096201 A1* | 4/2009 | Hiramatsu | B60R 22/46 |
| | | | 280/806 |
| 2017/0182973 A1* | 6/2017 | Clute | B60R 22/3413 |
| 2019/0291687 A1* | 9/2019 | Strutz | B60R 22/46 |

* cited by examiner

SAFETY BELT RETRACTOR, A VEHICLE SAFETY BELT AND A VEHICLE

RELATED APPLICATIONS

This application corresponds to PCT/CN2017/077580, filed Mar. 21, 2017, which corresponds to Chinese Application No. 201610160006.4, filed Mar. 21, 2016, the subject matter of which are incorporated herein by reference in their entirety.

TECHNICAL FIELD OF THE INVENTION

The present invention relates to a safety belt retractor, a vehicle safety belt with the safety belt retractor and a vehicle with the vehicle safety belt.

BACKGROUND OF THE INVENTION

A vehicle safety belt is an important component in a vehicle passenger restraint system, and particularly provides protection for a vehicle passenger in a traffic accident and avoids injury of the passenger or minimizes the injury. Pre-tensioning and force-limiting safety belts are applied widely increasingly. Such safety belts have a pre-tensioning function, such that the restraint force on passengers can be enhanced during traffic accidents, thereby providing effective protection for passengers. Such safety belts further have a force-limiting function to avoid application of an overlarge force to passengers and prevent injury caused thereby.

Chinese patent application document CN102490681A discloses a safety belt retractor, comprising a safety belt reel, a pre-tensioning device arranged on one end of the safety belt reel and a force-limiting device arranged on the other end of the safety belt reel. Due to the pre-tensioning device and the force-limiting device arranged on the two ends of the safety belt reel independently from each other, such a safety belt retractor needs a big structural space in an axial direction of the safety belt reel. Additionally, the pre-tensioning force of the pre-tensioning device and the limiting force of the force-limiting device are borne in a superposed manner by a passenger wearing the vehicle safety belt, which is disadvantageous.

German patent application document DE102010054845A1 also discloses a safety belt retractor, comprising a safety belt reel, a driving element, and a driving unit according to a pyrotechnic technology for driving the driving element, wherein one end, opposite to the driving element, of the safety belt reel is held down by an elastic housing wall and is capable of moving in an axial direction against the hold-down force of the housing wall. In one embodiment of this document, the driving element is provided with inner conical teeth, and the safety belt reel is provided with corresponding outer conical teeth. When a torque between the driving element and the safety belt reel reaches a certain threshold, the safety belt reel is forced to move in the axial direction against the hold-down force of the housing wall, such that the safety belt reel is substantially released from the driving element. Herein, an axial space needs to be reserved at the one end, opposite to the driving element, of the safety belt reel so as to allow axial movement of the safety belt reel, and a big axial space is also required at the end, where the driving element is arranged, of the safety belt reel. The safety belt reel cannot be thoroughly decoupled from the driving element, and a decoupling travel is relatively long. In addition, the driving unit according to the pyrotechnic technology mentioned in this document may be applied to the present invention, and hereby forms a part of contents described in the present application by reference thereto.

Chinese patent application document CN103547490A discloses a safety belt retractor, comprising a safety belt reel, a driving element, and a driving unit according to a pyrotechnic technology for driving the driving element. This document mainly involves a pre-tensioning device, but does not reveal a force-limiting device in detail. Herein, the pre-tensioning device and the force-limiting device are independent from each other, and the pre-tensioning force of the pre-tensioning device and the limiting force of the force-limiting device borne in a superposed manner by a passenger wearing the vehicle safety belt, which is disadvantageous. Moreover, the driving unit according to the pyrotechnic technology mentioned in this document may be applied to the present invention, and hereby forms a part of contents described in the present application by reference thereto.

SUMMARY OF THE INVENTION

The present invention aims at providing a safety belt retractor, which achieves, on the same end segment, the pre-tensioning, force-limiting and decoupling functions as well as a compact structure. The present invention further aims at providing a vehicle safety belt with the safety belt retractor and a vehicle with the vehicle safety belt.

To this end, a safety belt retractor is proposed, which is provided, on an end segment thereof, with a pre-tensioning, force-limiting and decoupling device that comprises a safety belt reel supported rotatably and immovably axially and that comprises a driving element. The pre-tensioning, force-limiting and decoupling device further comprises a sleeve and an energy absorbing disc. Viewed outwards in an axial direction, the end segment of the safety belt reel has a first section, a second section and a third section, diameters of which are successively reduced. A first recess is arranged in the second section. A first helical surface is arranged on an end, facing a safety belt retracting direction, of the first recess. A helical direction of the first helical surface corresponds to the safety belt retracting direction. Preferably, a generatrix of the first helical surface is in a radial direction or is at an angle of less than 20°, particularly less than 10°, and especially less than 5° with respect to the radial direction. A second recess is arranged in the third section. The driving element is sleeved on the second section. An axial inner end of the driving element abuts against an axial outer end of the first section. The driving element is provided, on an inner circumferential surface thereof, with a first projection which is mounted in the first recess. A second surface acting together with the first helical surface, preferably a second helical surface in planar close fit with the first helical surface in a mounting state, is arranged on an end, facing the safety belt retracting direction, of the first projection. The sleeve is sleeved on the third section and is located within the driving element in the radial direction, and the sleeve is provided, on an inner circumferential surface thereof, with a second projection that is mounted in the second recess. The second projection is capable of being cut off when a predetermined load is exceeded, while the first projection is capable of bearing the predetermined load. The driving element is capable of transferring an axial force to the sleeve. An axial gap is arranged between the energy absorbing disc on one side and an axial outer end of the sleeve and an axial outer end of the driving element on the other side, wherein an axial dimension, which is preferably 1-3 mm and particularly about 1 mm, of the axial gap is smaller than an axial dimension, which is preferably 2-10 mm, particularly 4-6 mm and especially about 4 mm, of the first projection. The energy absorbing disc is plastically deformable when squeezed by the axial outer end of the sleeve and/or the axial outer end of the driving element. Under the predetermined load, rated pre-tensioning time is defined by the sum of the cut-off time, preferably 3-6 ms, of the second projection, and the squeezing plastic deformation time, preferably 8-16 ms, of the energy absorbing disc.

By means of the configuration of the present invention, compared with a safety belt retractor with a pre-tensioning device and a force-limiting device separate from each other in the prior art, the safety belt retractor of the present invention is more compact in axial structural space, and also the number of parts thereof is remarkably reduced, and further, a complete decoupling function also can be achieved.

Herein, unless otherwise indicated, the axial direction means the axial direction of the safety belt reel, and the radial direction means the radial direction of the safety belt reel. That is to say, the longitudinal direction, the radial direction and the circumferential direction are defined with reference to the longitudinal axis of the safety belt reel.

In a particularly preferred embodiment, the first helical surface has a constant helical angle, and the second surface is a second helical surface having the same constant helical angle, and the two helical surfaces are completely complementary and thus in planar fit with each other. As an equivalent or alternative solution, for example, a roller or a plurality of roller pins are arranged on the second surface, wherein the roller or the roller pins can roll on the first helical surface, and therefore, a sliding motion is replaced by a rolling motion during decoupling. It is also possible to interchange the first helical surface and the second surface, and in this case, there are a first surface and a second helical surface. These equivalent or alternative solutions also fall into the protection scope of the present invention.

According to a preferred embodiment of the present invention, the energy absorbing disc is made of a steel sheet; preferably, the energy absorbing disc is capable of being completely flattened when squeezed by the axial outer end of the sleeve and/or the axial outer end of the driving element. As a result, the axial structural space can be further compact.

According to a preferred embodiment of the present invention, the driving element is a gear wheel, which can particularly be driven by a driving unit according to a pyrotechnic technology.

According to a preferred embodiment of the present invention, the driving element is provided with two first projections that are arranged oppositely in a diameter of the inner circumferential surface of the driving element; preferably, each first projection is provided with a second surface; and correspondingly, the second section is provided with two first recesses. By means of this technical measure, not only the driving element but also the sleeve is relatively uniform in bearing loads. Certainly, just one first projection and just one first recess, or more first projections and first recesses may also be taken into account, and they may be distributed uniformly or non-uniformly in the circumferential direction.

According to a preferred embodiment of the present invention, the sleeve is provided with two second projections that are arranged oppositely in a diameter of the inner circumferential surface of the sleeve and extend in a circumferential direction; preferably, the third section has two corresponding L-shaped grooves. When the sleeve is sleeved on the third section, the second projections firstly move axially along axial branches of the L-shaped grooves up to intersection points of the axial branches and circumferential branches of the L-shaped grooves and then move into the circumferential branches of the L-shaped grooves through a rotational motion; and the circumferential branches form second recesses. By means of this technical measure, the sleeve is very simple to mount on the safety belt reel. Certainly, just one second projection and just one second recess, or more second projections and second recesses may also be taken into account, and they may be distributed uniformly or non-uniformly in the circumferential direction.

According to a preferred embodiment of the present invention, the second projections and the second recesses are provided, on ends thereof facing the safety belt retracting direction, with a snap-fit connection, thereby ensuring steady mounting of the sleeve on the safety belt reel in a simple way.

According to a preferred embodiment of the present invention, the sleeve is provided, on the axial outer end thereof, with a flange, and the driving element is provided, on the axial outer end thereof, with a recess for receiving the flange; and preferably, the axial outer end of the sleeve and the axial outer end of the driving element form a common plane. Thus, particularly favorable axial force transfer of the driving element to the sleeve can be achieved.

According to a preferred embodiment of the present invention, viewed outwards axially, the end segment of the safety belt reel further comprises a fourth section with a reduced diameter, and therefore, the axial outer end of the third section forms a surrounding shoulder; preferably the fourth section passes through a hole in a housing; preferably the energy absorbing disc is sleeved on the fourth section; and preferably the energy absorbing disc is clamped between the housing and the shoulder. Thus, extremely stable support of the safety belt reel and good mounting of the energy absorbing disc can be achieved.

According to a preferred embodiment of the present invention, the first helical surface has a constant helical angle or a variable helical angle; preferably, the variable helical angle of the first helical surface is reduced progressively from inside to outside in the axial direction, particularly according to the following formula:

$$\tan \alpha = \tan \alpha_0 * (1 - x/(k*l)),$$

$$k = (l/c)^{1/2},$$

wherein $\alpha$ represents the helical angle of the first helical surface at a certain point; $\alpha_0$ represents the helical angle of the first helical surface at the axial inner end thereof; $x$ represents an axial distance between the certain point and the axial inner end of the first helical surface; $l$ represents a distance between the axial inner end and the axial outer end of the first helical surface; $k$ represents a constant greater than 1; and $c$ represents an initial axial gap between the energy absorbing disc and the axial outer end of the sleeve and/or the axial outer end of the driving element. By means of the favorable helical angle design, rapid decoupling start, favorable pre-tensioning time and good force-limiting can be achieved.

According to a preferred embodiment of the present invention, the safety belt retractor further comprises a driving unit according to a pyrotechnic technology, and the driving unit is capable of driving the driving element.

The invention also claims a vehicle safety belt comprising the safety belt retractor for the vehicle safety belt according to the present invention.

The invention further claims a vehicle comprising the safety belt retractor according to the present invention.

BRIEF DESCRIPTION TO THE DRAWINGS

The present invention is described in detail below through embodiments in conjunction with accompanying drawings, in which.

DETAILED DESCRIPTION TO THE EMBODIMENTS

Illustrated in the accompanying drawings is a safety belt retractor 6 for a vehicle safety belt according to an embodiment of the present invention, wherein a pre-tensioning, force-limiting and decoupling device is arranged on an end segment of the safety belt retractor 6.

Figure 1A:
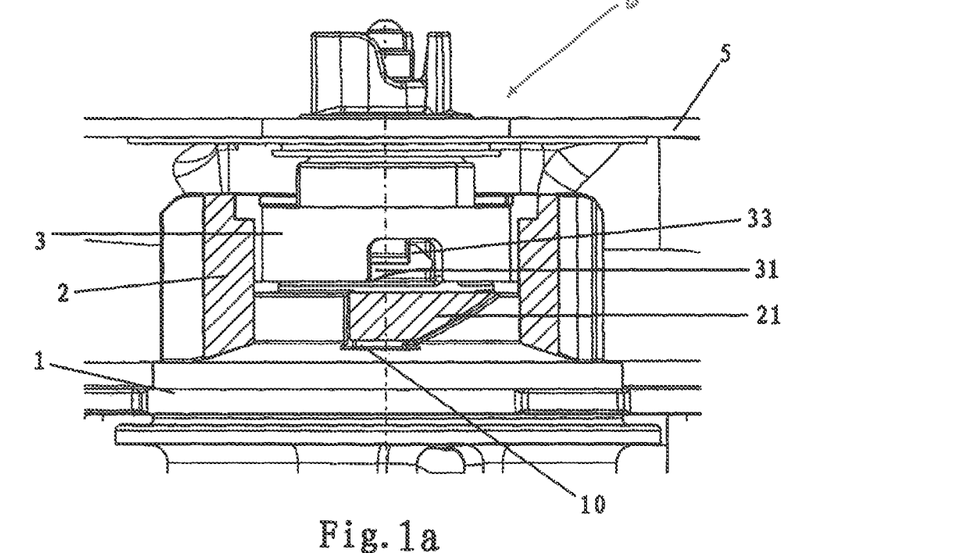
FIG. 1a is a partial longitudinal section view of a safety belt retractor according to the present invention in a first state, showing helical surfaces acting together.
Figure 1B:
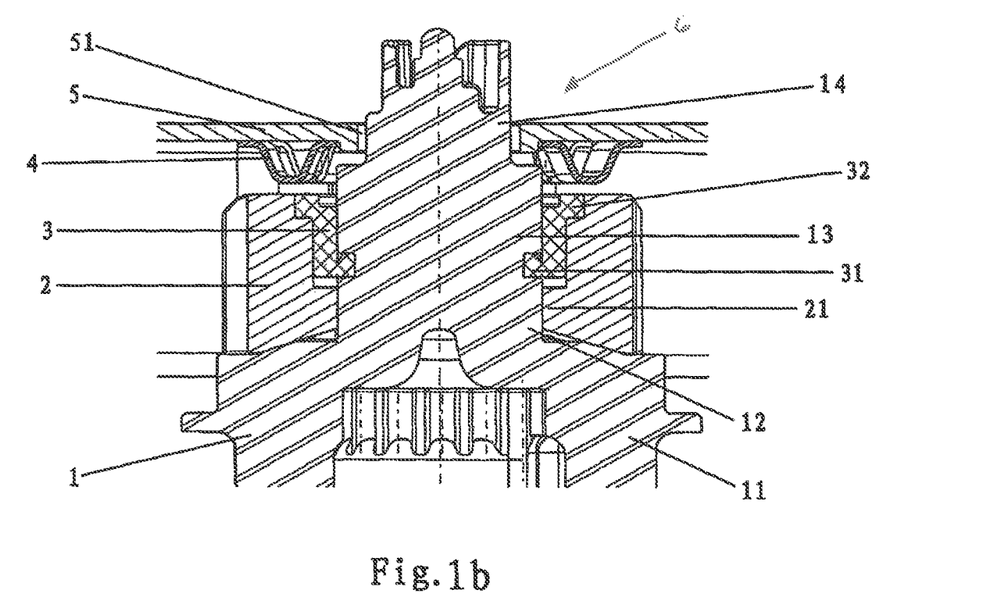
FIG. 1b is a partial longitudinal section view, rotated by 90° relative to FIG. 1a, of the safety belt retractor according to the present invention in the first state.
Figure 2A:
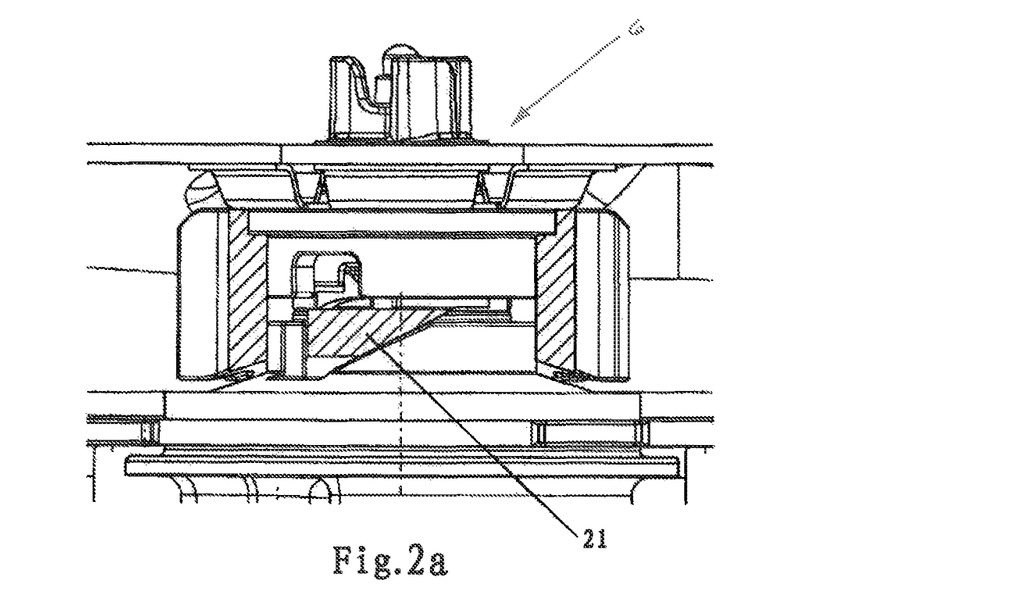
FIG. 2a is a partial longitudinal section view, corresponding to FIG. 1a, of a safety belt retractor according to the present invention in a second state, showing the helical surfaces acting together.
Figure 2B:
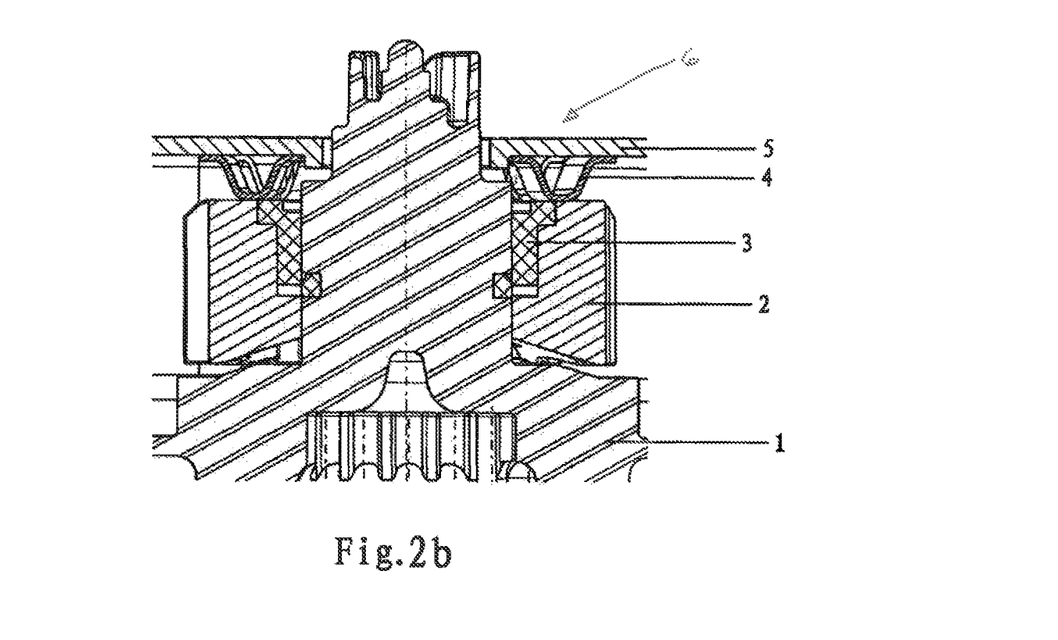
FIG. 2b is a partial longitudinal section view, rotated by 90° relative to FIG. 2a, of the safety belt retractor according to the present invention in the second state.
Figure 3A:
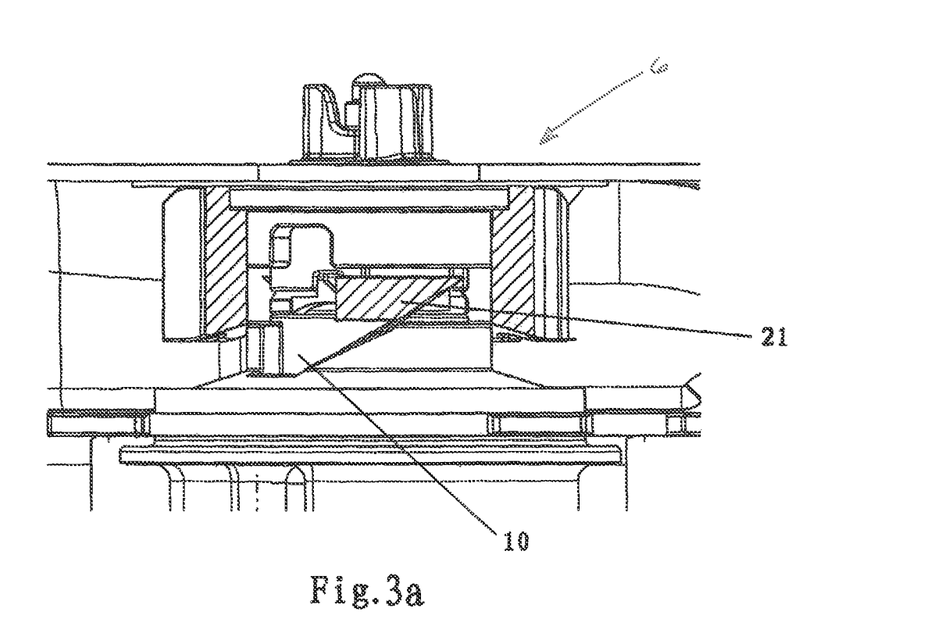
FIG. 3a is a partial longitudinal section view of a safety belt retractor according to the present invention in a third state, showing the helical surfaces acting together and already separated from each other.
Figure 3B:
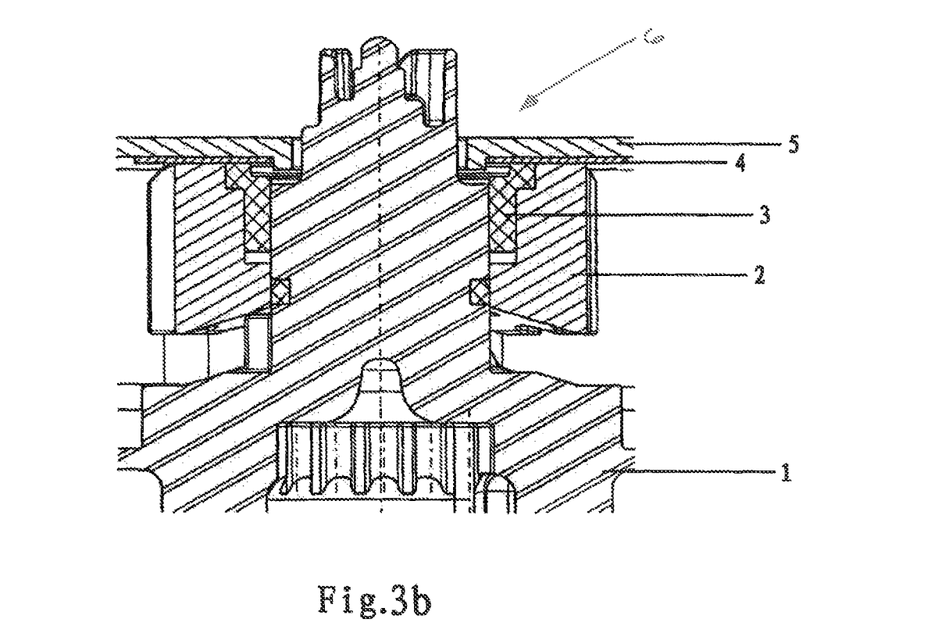
FIG. 3b is a partial longitudinal section view, rotated by 90° relative to FIG. 3a, of the safety belt retractor according to the present invention in the third state.

In the embodiment shown in the figures, FIG. 1a is a partial longitudinal section view of the pre-tensioning, force-limiting and decoupling device according to the present invention in a first state, showing helical surfaces acting together; FIG. 1b is a partial longitudinal section view, rotated by 90° relative to FIG. 1a, of the pre-tensioning, force-limiting and decoupling device according to the present invention in the first state, the first state corresponding to an initial state. FIG. 2a is a partial longitudinal section view, corresponding to FIG. 1a, of the pre-tensioning, force-limiting and decoupling device according to the present invention in a second state, showing the helical surfaces acting together; FIG. 2b is a partial longitudinal section view, rotated by 90° relative to FIG. 2a, of the pre-tensioning, force-limiting and decoupling device according to the present invention in the second state. In the second state, a second projection 31 of a sleeve 3 has been cut off, the driving element 2 has rotated by a certain angle relative to a safety belt reel 1, and an axial outer end of the driving element 2 and an axial outer end of the sleeve 3 are just in contact with an energy absorbing disc 4, but do not compress the energy absorbing disc 4 yet. FIG. 3a is a partial longitudinal section view of the pre-tensioning, force-limiting and decoupling device according to the present invention in a third state, showing helical surfaces acting together and already separated from each other; FIG. 3b is a partial longitudinal section view, rotated by 90° relative to FIG. 3a, of the pre-tensioning, force-limiting and decoupling device according to the present invention in the third state. In the third state, the driving element 2 is decoupled from the safety belt reel 1 and the energy absorbing disc 4 is completely flattened.

The pre-tensioning, force-limiting and decoupling device according to the present invention includes the safety belt reel 1 that includes a first section 11, a second section 12 and a third section 13 as well as an optional fourth section 14, diameters of which are successively reduced. An axial outer end of the first section 11, namely an end, facing the driving element 2 in an axial direction, of the first section 11, forms a shoulder for supporting the driving element 2, and more specifically, supporting an axial inner end of the driving element 2, namely an end, facing the first section 11 in the axial direction, of the driving element 2. A first recess 10 is arranged in the second section 12. In the embodiment shown in the accompanying drawings, there are two first recesses 10 spaced apart by 180° in a circumferential direction, but only one first recess 10 can be seen in the figures. In the first state shown in FIGS. 1a and 1b, namely the initial state, a first projection 21 of the driving element 2 is mounted in the first recess 10. A first helical surface 9 is arranged on an end, facing a safety belt retracting direction, of the first recess 10, and a helical direction of the first helical surface corresponds to the safety belt retracting direction. The first projection 21 is provided with a second surface 23 acting together with the first helical surface 9, and particularly preferably, the second surface is a second helical surface 23 in planar close fit with the first helical surface 9 in a mounting state. In a preferred solution, a generatrix of the first helical surface 9 is in a radial direction; in other words, in a section view transverse to a longitudinal axis of the safety belt reel, a section line of the first helical surface is in the radial direction. It is also possible that the generatrix of the first helical surface 9 is an angle of less than 30°, particularly less than 10° and especially less than 5°, such as 25°, 20°, 15°, 3° and so on, with respect to the radial direction.

Figure 4A:
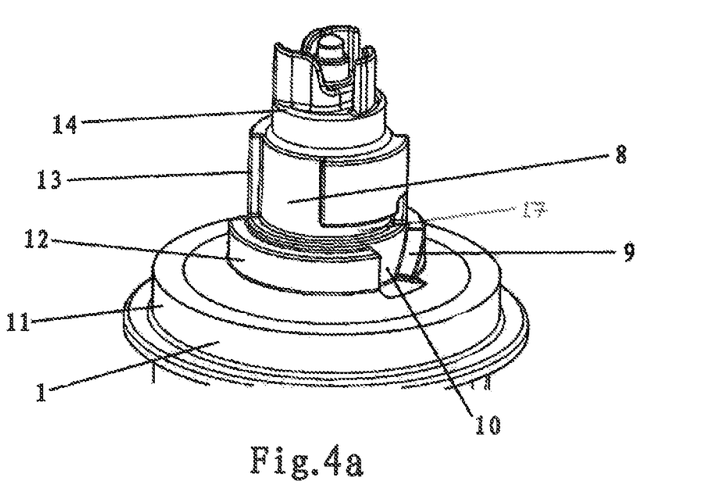
FIG. 4a is a partial perspective view of a safety belt reel.
Figure 4B:
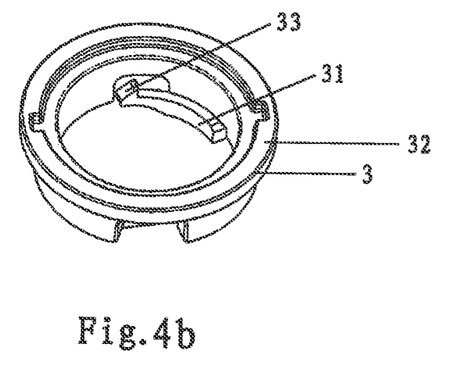
FIG. 4b is a perspective view of a sleeve.
Figure 4C:
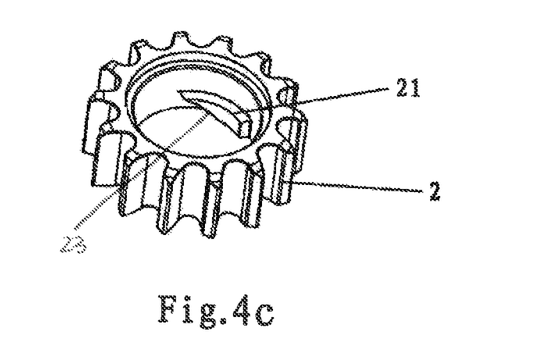
FIG. 4c is a perspective view of a driving element.

The driving element 2 is sleeved on the second section 12, and the driving element 2 is provided, on an inner circumferential surface thereof, with the first projection 21, preferably the first projection 21 extending in the circumferential direction. The first projection 21 is mounted in the first recess 10. The second surface 23 acting together with the first helical surface 9, preferably a second helical surface in planar close fit with the first helical surface in the mounting state, is arranged on an end, facing the safety belt retracting direction, of the first projection 21. Particularly preferably, the driving element 2 is a gear wheel, which may be driven by, for example, a driving unit according to a pyrotechnic technology. In the embodiment shown in the accompanying drawings, the driving element 2 is provided with two first projections 21 that are oppositely arranged in a diameter of the inner circumferential surface of the driving element, and each first projection is provided with one second surface 23, and correspondingly, the second section 12 are provided with two first recesses 10.

The sleeve 3 is sleeved on the third section 13 and is located within the driving element 2 in the radial direction. The sleeve 3 is provided, on an inner circumferential surface thereof, with the second projection 31 that is mounted in a second recess 17. According to a preferred solution, the sleeve 3 is provided with two second projections 31 that are oppositely arranged in a diameter of the inner circumferential surface of the sleeve and extend in the circumferential direction; preferably, the third section 13 includes two corresponding L-shaped grooves 8. When the sleeve 3 is sleeved on the third section 13, the second projections 31 firstly move, in the axial direction along the axial branches of the L-shaped grooves up to intersection points of axial branches and circumferential branches of the L-shaped grooves, and then move into the circumferential branches of the L-shaped grooves through a rotational motion, wherein the circumferential branches form the second recesses 17. Hence, the sleeve 3 is very simple to mount. To hold the sleeve 3 in the mounting state, preferably the projections 31 and the second recesses 17 are provided, on their ends facing the safety belt retracting direction, with a snap-fit connection 33. Needless to say, other holding means, for example, a press-fit manner or a bonding manner, also may be taken into account.

The second projection 31 is capable of being cut off when a predetermined load is exceeded, and the first projection 21 is capable of bearing the predetermined load. The driving element 2 is capable of transferring an axial force to the sleeve 3. The axial force acting on the second projection 31 is proportional to a force on a safety belt or a force applied to a passenger wearing the safety belt. According to a preferred solution, the predetermined load corresponds to a safety belt force of about 2 KN, particularly the safety belt force of 2+/−0.3 KN.

Transferring the axial force from the driving element 2 to the sleeve 3 may be implemented in various ways. In a preferred solution, as shown in the figures, the sleeve 3 is provided, on the axial outer end thereof, with a flange 32, and the driving element 2 is provided, on the axial outer end thereof, with a recess for accommodating the flange. Preferably, the axial outer end of the sleeve and the axial outer end of the driving element form a common plane. The flange 32 may be formed by a surrounding flange, and may also be composed of a plurality of flange segments spaced apart from each other in the circumferential direction. Correspondingly, the recess for accommodating the flange 32 may be formed by a surrounding recess, and may also be composed of a plurality of recess segments spaced apart from each other in the circumferential direction. As an equivalent solution, the flange 32 also may be directly supported on the flat axial outer end of the driving element 2, i.e., no recess for accommodating the flange 32 is arranged in the axial outer end of the driving element 2, and in this case, an outer diameter of the flange 32 may be equal to, greater than or smaller than an outer diameter of the driving element.

The pre-tensioning, force-limiting and decoupling device according to the present invention further includes the energy absorbing disc 4 that is arranged oppositely to the axial outer end of the sleeve 3 and the axial outer end of the driving element 2 with an axial gap formed therebetween, and an axial dimension of the axial gap is preferably 1-4 mm, for example, about 1 mm, 2 mm or 3 mm. The axial dimension of the axial gap is smaller than an axial dimension, which is preferably 2-10 mm, particularly 4-6 mm and especially about 4 mm, of the first projection. The energy absorbing disc 4 is plastically deformable when squeezed by the axial outer end of the sleeve 3 and/or the axial outer end of the driving element 2. In the embodiment shown in the figures, the energy absorbing disc 4 can be simultaneously squeezed by the axial outer end of the sleeve 3 and the axial outer end of the driving element 2 and can be finally flattened.

Under the predetermined load, the second projection 31 is cut off, and the cut-off time thereof is preferably 3-6 ms.

Under the predetermined load, the energy absorbing disc 4 is squeezed to be plastically deformed until being finally flattened, and the squeezing plastic deformation time is preferably 8-16 ms. Rated pre-tensioning time is defined by elapsed time starting when the driving unit is activated and ending when the energy absorbing disc 4 is completely flattened, and it is preferably about 20 ms, for example, within a range of 16 ms to 24 ms.

As shown in the figures, the end segment of the safety belt reel further comprises the fourth section 14 the diameter of which is reduced, and therefore, the axial outer end of the third section 13 forms a surrounding shoulder; the fourth section 14 passes through a hole 51 in a housing 5; and the energy absorbing disc 4 is sleeved on the fourth section 14 and is clamped between the housing 5 and the surrounding shoulder.

According to a preferred solution, the first helical surface 9 has a constant helical angle, which is, for example, within a range of 5-85°, preferably 20-70° and especially 30-50°, such as 60°, 45°, 30° and so on. The first helical surface 9 also may have a variable helical angle; preferably, the helical angle of the first helical surface is reduced progressively from inside to outside in the axial direction, particularly according to the following formula:

$$\tan \alpha = \tan \alpha_0 * (1 - x/(k*l)),$$

$$k = (l/c)^{1/2},$$

wherein α represents the helical angle of the first helical surface at a certain point; $\alpha_0$ represents the helical angle of the first helical surface at the axial inner end thereof; x represents an axial distance between the certain point and the axial inner end of the first helical surface; l represents a distance between the axial inner end and the axial outer end of the first helical surface; and k represents a constant greater than 1. In the formula $k=(l/c)^{1/2}$, c represents an initial axial gap between the energy absorbing disc and the axial outer end of the sleeve and/or the axial outer end of the driving element. By means of the helical angles determined in such a manner, rapid decoupling start, favorable pre-tensioning time and good force-limiting can be achieved.

Thus, according to a favorable solution, $\alpha_0$ is 45°, and k is 2. Hence, the helical angle of the first helical surface 10 at the axial inner end thereof is 45°, and the helical angle thereof at the axial outer end is 30°.

It needs to be noted herein that the specific embodiments described above are merely used for understanding the present invention rather than limiting the protection scope of the present invention. Equal or equivalent measures also may be taken into account and fall into the protection scope of the present invention.

The invention claimed is:

1. A safety belt retractor (6), provided, on an end segment thereof, with a pre-tensioning, force-limiting and decoupling device that comprises a safety belt reel (1) supported rotatably and immovably axially and that comprises a driving element (2), wherein, the pre-tensioning, force-limiting and decoupling device further comprises a sleeve (3) and an energy absorbing disc (4), viewed outwards axially, the end segment of the safety belt reel comprises a first section (11), a second section (12) and a third section (13), diameters of which are successively reduced, wherein a first recess (10) is arranged in the second section (12); a first helical surface (9) is arranged on an end of the first recess facing a safety belt retracting direction, wherein a helical direction of the first helical surface corresponds to the safety belt retracting direction, wherein a generatrix of the first helical surface being in a radial direction or being at an angle of less than 20° with respect to the radial direction, and wherein a second recess (17) is arranged in the third section (13), the driving element (2) is sleeved on the second section (12), with an axial inner end thereof abuts against an axial outer end of the first section (11), and has a first projection (21) on an inner circumferential surface thereof, wherein the first projection is mounted in the first recess (10), wherein a second helical surface (23) is arranged on an end of the first projection facing the safety belt retracting direction and in planar close fit with the first helical surface in a mounting state, the sleeve (3) is sleeved on the third section (13) and is located within the driving element (2) radially, and on an inner circumferential surface thereof has a second projection (31) that is mounted in the second recess, wherein the second projection (31) can be cut off when a predetermined load is exceeded, while the first projection (21) can bear the predetermined load, wherein the driving element (2) can transfer an axial force to the sleeve (3), an axial gap is arranged between the energy absorbing disc (4) on one side and an axial outer end of the sleeve and an axial outer end of the driving element on the other side, wherein an axial dimension of the axial gap is smaller than an axial dimension of the first projection, wherein the energy absorbing disc (4) is plastically deformable when squeezed by the axial outer end of the sleeve and/or the axial outer end of the driving element, under the predetermined load, a rated pre-tensioning time is defined by the sum of the cut-off time of the second projection (31), and the squeezing plastic deformation time of the energy absorbing disc (4).

2. The safety belt retractor of claim 1, wherein the energy absorbing disc (4) is made of a steel sheet, and can be flattened completely when squeezed by the axial outer end of the sleeve and/or the axial outer end of the driving element.

3. The safety belt retractor of claim 1, wherein the driving element (2) is a gear wheel.

4. The safety belt retractor of claim 1, wherein the driving element (2) has two first projections (21) that are arranged oppositely in a diameter of the inner circumferential surface of the driving element, which are provided with a second surface respectively, correspondingly, the second section (12) has two first recesses (10).

5. The safety belt retractor of claim 1, wherein the sleeve (3) has two second projections (31) that are arranged oppositely in a diameter of the inner circumferential surface of the sleeve and extend in a circumferential direction, wherein the third section (13) has two corresponding L-shaped grooves (8), wherein when the sleeve (3) is sleeved on the third section (13), the second projections (31) firstly move axially along the axial branches of the L-shaped grooves (8) up to intersection points of axial branches and circumferential branches of the L-shaped grooves and then move into the circumferential branches of the L-shaped grooves through a rotational motion, wherein the circumferential branches form the second recesses (17).

6. The safety belt retractor of claim 1, wherein the second projection (31) and the second recess are provided, on an end thereof facing the safety belt retracting direction, with a snap-fit connection (33).

7. The safety belt retractor of claim 1, wherein the sleeve (3) is provided, on the axial outer end thereof, with a flange (32), and the driving element (2) is provided, on the axial outer end thereof, with a recess for receiving the flange, wherein the axial outer end of the sleeve and the axial outer end of the driving element form a common plane.

8. The safety belt retractor of claim 1, wherein viewed outwards axially, the end segment of the safety belt reel further comprises a fourth section (14) with a reduced diameter, and therefore, the axial outer end of the third section (13) forms a surrounding shoulder, wherein the fourth section (14) passes through a hole (51) in a housing (5) and the energy absorbing disc (4) is sleeved on the fourth section (14) and is clamped between the housing (5) and the shoulder.

9. The safety belt retractor of claim 1, wherein the first helical surface (9) has a variable helical angle that is reduced progressively from inside to outside axially according to the following formula:

$$\tan \alpha = \tan \alpha_0 *(1-x/(k*l)),$$

$$k=(l/c)^{1/2},$$

wherein $\alpha$ represents the helical angle of the first helical surface at a certain point, $\alpha_0$ represents the helical angle of the first helical surface at the axial inner end thereof, x represents an axial distance between the certain point and the axial inner end of the first helical surface, l represents a distance between the axial inner end and the axial outer end of the first helical surface, k represents a constant greater than 1, and c represents an initial axial gap between the energy absorbing disc and the axial outer end of the sleeve and/or the axial outer end of the driving element.

10. The safety belt retractor of claim 1, wherein the generatrix of the first helical surface is at an angle of less than 10° with respect to the radial direction.

11. The safety belt retractor of claim 1, wherein the axial dimension of the axial gap is 1-3 mm.

12. The safety belt retractor of claim 1, wherein the axial dimension of the axial gap is 1 mm.

13. The safety belt retractor of claim 1, wherein the axial dimension of the first projection is 2-10 mm.

14. The safety belt retractor of claim 1, wherein the axial dimension of the first projection is 4-6 mm.

15. The safety belt retractor of claim 1, wherein the axial dimension of the first projection is 4 mm.

16. The safety belt retractor of claim 1, wherein the cut-off time of the second projection is 3-6 ms and the squeezing deformation time of the energy absorbing disc is 8-16 ms.

17. The safety belt retractor of claim 1, wherein the axial dimension of the axial gap is 1 mm, the axial dimension of the first projection is 4 mm, the cut-off time of the second projection is 3-6 ms, and the squeezing deformation time of the energy absorbing disc is 8-16 ms.

* * * * *

UNITED STATES PATENT AND TRADEMARK OFFICE
CERTIFICATE OF CORRECTION

PATENT NO. : 10,899,312 B2  
APPLICATION NO. : 16/087307  
DATED : January 26, 2021  
INVENTOR(S) : Yong Han Page 1 of 1

It is certified that error appears in the above-identified patent and that said Letters Patent is hereby corrected as shown below:

On the Title Page

In Item (71) of the Applicant, please change the Applicant Name to -- ZF ASIA PACIFIC AUTOMOTIVE SAFETY SYSTEMS (SHANGHAI) CO. --.

Signed and Sealed this
Twenty-fourth Day of June, 2025

Coke Morgan Stewart
*Acting Director of the United States Patent and Trademark Office*